United States Patent
Liu et al.

(10) Patent No.: US 10,097,811 B2
(45) Date of Patent: Oct. 9, 2018

(54) MULTI-PART CORRESPONDER FOR MULTIPLE CAMERAS

(71) Applicant: Cognex Corporation, Natick, MA (US)

(72) Inventors: Lifeng Liu, Sudbury, MA (US); Cyril C. Marrion, Acton, MA (US)

(73) Assignee: Cognex Corporation, Natick, MA (US)

( * ) Notice: Subject to any disclaimer, the term of this patent is extended or adjusted under 35 U.S.C. 154(b) by 523 days.

(21) Appl. No.: 13/714,524

(22) Filed: Dec. 14, 2012

(65) Prior Publication Data

US 2013/0155199 A1 Jun. 20, 2013

Related U.S. Application Data

(60) Provisional application No. 61/576,952, filed on Dec. 16, 2011.

(51) Int. Cl.
*H04N 13/239* (2018.01)
*G06T 7/80* (2017.01)

(52) U.S. Cl.
CPC ............ *H04N 13/239* (2018.05); *G06T 7/85* (2017.01); *G06T 2207/10012* (2013.01); *G06T 2207/30108* (2013.01)

(58) Field of Classification Search
None
See application file for complete search history.

(56) References Cited

U.S. PATENT DOCUMENTS

| 5,724,493 A * | 3/1998 | Hosoya ................... G06T 17/00 345/423 |
| 2009/0010507 A1* | 1/2009 | Geng ....................... G06T 7/593 382/128 |
| 2010/0166294 A1* | 7/2010 | Marrion ............. G06K 9/00214 382/154 |
| 2011/0234759 A1* | 9/2011 | Yamaya ................ G06T 7/0028 348/46 |
| 2012/0275686 A1* | 11/2012 | Wilson ............... G06K 9/00355 382/154 |
| 2013/0038696 A1* | 2/2013 | Ding ........................ G02B 5/09 348/47 |

OTHER PUBLICATIONS

D.D.A.P. Ariyawansa, et al.; "High speed correspondence for object recognition and tracking"; SPIE vol. 3174; Jun. 7, 1997.*

(Continued)

*Primary Examiner* — William C Vaughn, Jr.
*Assistant Examiner* — Jerry Jean Baptiste
(74) *Attorney, Agent, or Firm* — Proskauer Rose LLP

(57) ABSTRACT

Described are methods, systems, and apparatus, including computer program products for finding correspondences of one or more parts in a camera image of two or more cameras. For a first part in a first camera image of a first camera, a first 3D ray that is a first back-projection of a first feature coordinate of the first part in the first camera image to a 3D physical space is calculated. For a second part in a second camera image of a second camera, a second 3D ray that is a second back-projection of a second feature coordinate of the second part in the second camera image to the 3D physical space is calculated, wherein the first feature coordinate and the second feature coordinate correspond to a first feature as identified in a model. A first distance between the first 3D ray and the second 3D ray is calculated.

17 Claims, 4 Drawing Sheets

(56) References Cited

OTHER PUBLICATIONS

Ariyawansa (High speed correspondence for object recognition and tracking, Jul. 1997).*
D.D.A.P. Ariyawansa, et al.; "High speed correspondence for object recognition and tracking"; SPIE vol. 3174; Jun. 7, 1997; (10 pages).
Grundmann, Thilo, et al.; "A Gaussian Measurement Model for Local Interest Point Based 6 DOF Pose Estimation"; Robotics and Automation (ICRA), IEEE International Conference on May 9-13, 2011; (6 pages).
Clarke, T. A, et al.; "Automated Three Dimensional Measurement Using Multiple CCD Camera Views"; The Photogrammetric Record, vol. 15, Issue 85; Apr. 1995; (16 pages).

\* cited by examiner

MULTI-PART CORRESPONDER FOR MULTIPLE CAMERAS

CROSS REFERENCE TO RELATED APPLICATIONS

This application claims the benefit of and priority to U.S. Patent Application No. 61/576,952, filed on Dec. 16, 2011, and titled "Multi-Part Corresponder for Multiple Cameras," the entire contents of which are incorporated herein by reference.

FIELD OF THE TECHNOLOGY

The present invention relates generally to the field of machine vision and, more specifically to corresponding parts in separate camera images.

BACKGROUND

Digital images are formed by many devices and used for many practical purposes. Devices include cameras operating on visible or infrared light, line-scan sensors, flying spot scanners, electron microscopes, X-ray devices including CT scanners, magnetic resonance imagers, and other devices known to those skilled in the art. Practical applications are found in industrial automation, medical diagnosis, satellite imaging for a variety of military, civilian, and scientific purposes, photographic processing, surveillance and traffic monitoring, document processing, and many others.

To serve these applications the images formed by the various devices are analyzed by digital devices to extract appropriate information. One form of analysis that is of considerable practical importance is determining the position, orientation, and size of patterns in an image that correspond to objects in the field of view of the imaging device. Pattern location methods are of particular importance in industrial automation, where they are used to guide robots and other automation equipment in semiconductor manufacturing, electronics assembly, pharmaceuticals, food processing, consumer goods manufacturing, and many others.

In applications using more than one imaging device, another form of digital image analysis of practical importance is identifying the correspondence between parts in one device's field of view and another device's field of view (e.g., which parts in the separate fields of view correspond to the same physical part). Accordingly, systems and methods of quickly corresponding parts in separate fields of view are needed.

SUMMARY OF THE TECHNOLOGY

In one aspect, the technology relates to a computer-implemented method of finding correspondences of one or more parts in a camera image of two or more cameras. The method includes for a first part in a first camera image of a first camera, calculating a first 3D ray that is a first back-projection of a first feature coordinate of the first part in the first camera image to a 3D physical space. The method includes for a second part in a second camera image of a second camera, calculating a second 3D ray that is a second back-projection of a second feature coordinate of the second part in the second camera image to the 3D physical space, wherein the first feature coordinate and the second feature coordinate correspond to a first feature as identified in a model. The method includes calculating a first distance between the first 3D ray and the second 3D ray.

In another aspect, the technology relates to a computer-implemented method of finding correspondence of one or more parts in a camera image of two or more cameras. The method includes for a first part in a first camera image of a first camera, calculating a first 3D ray that is a back-projection of a first feature coordinate in the first camera image to a 3D physical space, calculating a second 3D ray that is a second back-projection of a second feature coordinate in the first camera image to the 3D physical space. The method includes for a second part in a second camera image of a second camera, calculating a third 3D ray that is a third back-projection of a third feature coordinate in the second camera image to the 3D physical space, calculating a fourth 3D ray that is a fourth back-projection of a fourth feature coordinate in the second camera image to the 3D physical space, wherein the first feature coordinate and the third feature coordinate correspond to a same first feature as identified in a model and the second feature coordinate and the fourth feature coordinate correspond to a same second feature as identified in the model. The method includes calculating a first point between closest points on the first and third 3D rays and a second point between closest points on the second and forth 3D rays.

In some embodiments, the method includes for the first part in the first camera image of the first camera, calculating a third 3D ray that is a third back-projection of a third feature coordinate in the first camera image to the 3D physical space, for the second part in the second camera image of the second camera, calculating a fourth 3D ray that is a fourth back-projection of a fourth feature coordinate in the second camera image to the 3D physical space, wherein the third feature coordinate and the fourth feature coordinate correspond to a second feature as identified in the model, and calculating a second distance between the third 3D ray and the fourth 3D ray.

In some embodiments, the method includes calculating a candidate part correspondence score based on at least one of the first distance and the second distance. In some embodiments, the candidate part correspondence score is an average of the first distance and the second distance. In some embodiments, the method includes excluding a pairing of the first part in the first camera image of the first camera and the second part in the second camera image of the second camera as a candidate part correspondence if the first distance exceeds a pre-determined threshold.

In some embodiments, the method includes for a third part in a third camera image of a third camera, calculating a third 3D ray that is a third back-projection of a third feature coordinate of the third part in the third camera image to the 3D physical space wherein the first feature coordinate, the second feature coordinate, and the third feature coordinate correspond to the first feature as identified in the model, and calculating a second distance between the third 3D ray and a first point between closest points on the first and second 3D rays.

In some embodiments, the method includes for a third part in a third camera image of a third camera, calculating a third 3D ray that is a third back-projection of a third feature coordinate of the third part in the third camera image to the 3D physical space wherein the first feature coordinate, the second feature coordinate, and the third feature coordinate correspond to the feature as identified in the model, and calculating a second distance between the first 3D ray and the third 3D ray and calculating a third distance between the second 3D ray and the third 3D ray.

In some embodiments, the method includes calculating a distance between the first point and the second point. In some embodiments, the method includes comparing the distance with a predetermined value to determine the distance residual. In some embodiments, the predetermined value is based on the first feature and the second feature as identified in the model. In some embodiments the predetermined value is based on an inputted value.

In some embodiments, the method includes calculating a candidate correspondence score based on the distance residual. In some embodiments, the method includes excluding a pairing of the first part in the first camera image and the second part in the second camera image as a candidate part correspondence if the distance residual exceeds a predetermined threshold. In some embodiments, the method includes calculating a first distance between the first 3D ray and the third 3D ray and calculating a second distance between the second 3D ray and the fourth 3D ray; and calculating a candidate part correspondence score based on the distance residual, the first distance and the second distance.

In another aspect the technology relates to a system. The system includes two or more cameras; a correspondence module configured to: for a first part in a first camera image of a first camera of the two or more cameras, calculate a first 3D ray that is a first back-projection of a first feature coordinate of the first part in the first camera image to a 3D physical space; for a second part in a second camera image of a second camera of the two or more cameras, calculate a second 3D ray that is a second back-projection of a second feature coordinate of the second part in the second camera image to the 3D physical space, wherein the first feature coordinate and the second feature coordinate correspond to a first feature as identified in a model; and calculate a first distance between the first 3D ray and the second 3D ray.

In another aspect, the technology relates to a system. The system includes two or more cameras; a correspondence module configured to: for a first part in a first camera image of a first camera of the two or more cameras, calculate a first 3D ray that is a back-projection of a first feature coordinate in the first camera image to a 3D physical space, calculate a second 3D ray that is a second back-projection of a second feature coordinate in the first camera image to the 3D physical space; for a second part in a second camera image of a second camera of the two or more cameras, calculate a third 3D ray that is a third back-projection of a third feature coordinate in the second camera image to the 3D physical space, calculate a fourth 3D ray that is a fourth back-projection of a fourth feature coordinate in the second camera image to the 3D physical space, wherein the first feature coordinate and the third feature coordinate correspond to a same first feature as identified in a model and the second feature coordinate and the fourth feature coordinate correspond to a same second feature as identified in the model; and calculate a first point between closest points on the first and third 3D rays and a second point between closest points on the second and forth 3D rays.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the presently described technology will be more fully understood from the following description of various embodiments, when read together with the accompanying drawings, in which.

DETAILED DESCRIPTION

In general, the technology involves computerized systems and computer-implemented methods for corresponding parts among multiple camera images. In 3D machine vision systems, two or more 2D cameras imaging the same or overlapping scenes can be used to determine 3D information (e.g., distance from a camera or other known point) about items in the scene or scenes. Determining whether an item in the field of view of one camera and an item in the field of view of a second camera correspond to the same physical item can facilitate utilizing the separate images in conjunction to determine 3D information about items in the scene. The computerized systems and computer-implemented methods described herein facilitate corresponding items in the fields of view of separate cameras.

Figure 1:
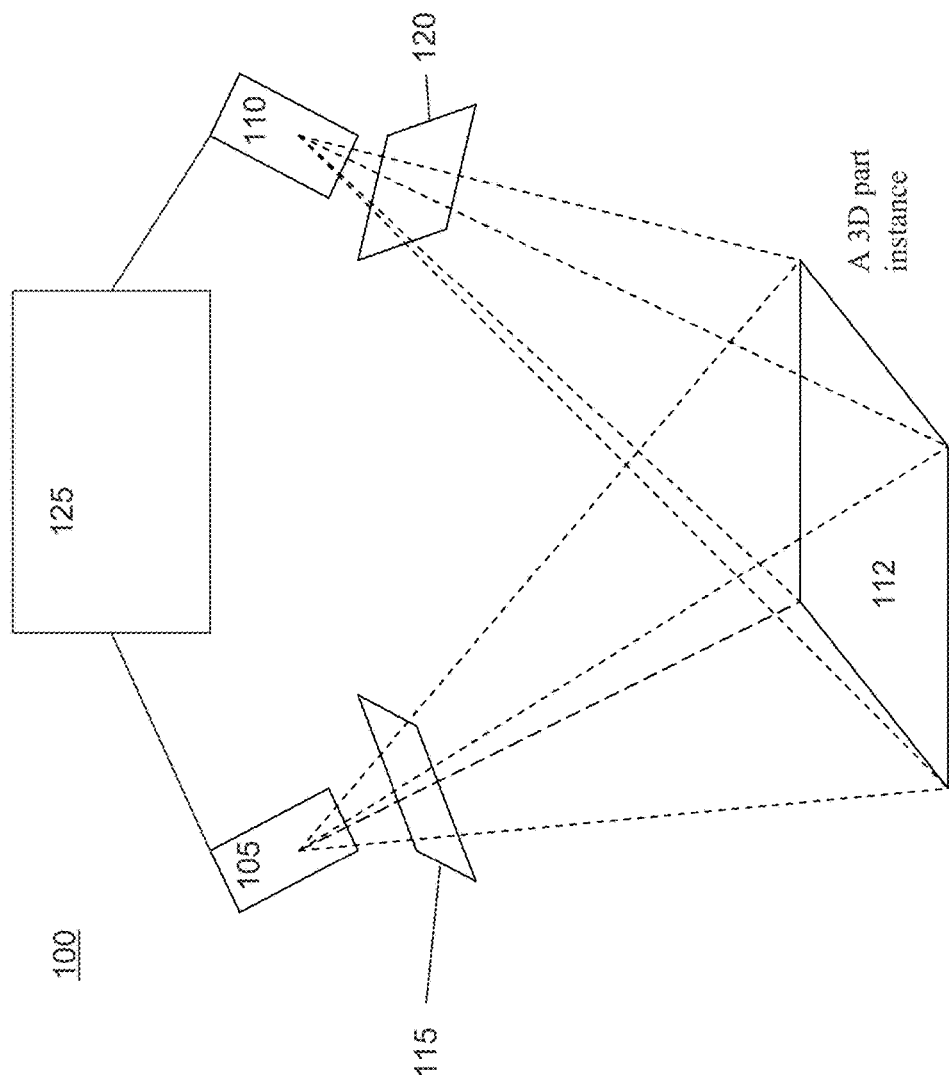
FIG. 1 depicts a system which can be used with the technology.

FIG. 1 depicts a system 100 which can be used with the technology. System 100 includes image capturing device (e.g., camera) 105 and image capturing device 110. Image capturing device 105 and image capturing device 110 are positioned to capture images of workspace 112. Image plane 115 is the image plane of image capturing device 105 and represents the two-dimensional plane of the images of workspace 112 captured by image capturing device 105. Image plane 120 is the image plane of image capturing device 110 and represents the two-dimensional plane of the images of workspace 112 captured by image capturing device 110. While system 100 is shown with two image capturing devices (image capturing device 105 and image capturing device 110), the technology can be used with systems having two or more image capturing devices.

System 100 includes correspondence module 125. Correspondence module 125 receives images from image capturing device 105 and image capturing 110. Correspondence module 125 can be configured to use the methods described herein to determine the correspondence of parts in image plane 115 (e.g., the field of view of image capturing device 105) to parts in image plane 120 (e.g., the field of view of image capturing device 110).

System 100 can be calibrated to provide a mathematical transform from one image capturing device's coordinate system to another image capturing device's coordinate system. System 100 can be calibrated to provide a mathematical transform from the image capturing devices' coordinate systems to a coordinate system for the physical scene in the image capture devices' fields of view. An image point x associated with a feature coordinate back-projects to a 3D ray defined by x and the camera center. Calibration relates the image point to the ray's direction. Additional information regarding camera calibration can be found in U.S. Pat. No. 6,798,925, titled "Method and apparatus for calibrating an image acquisition system" and filed Dec. 22, 2000, and "Multiple view Geometry in Computer Vision" Second Edition, Richard Hartley and Andrew Zisserman (2004), the entire contents of which are hereby incorporated by reference.

System 100 is an example of a computerized system that is specially configured to perform the computer-implemented methods described herein. However, the system structure and content recited with regard to FIG. 1 are for exemplary purposes only and are not intended to limit other examples to the specific structure shown in FIG. 1. As will be apparent to one of ordinary skill in the art, many variant system structures can be architected without departing from the computerized systems and methods described herein.

Figure 2:
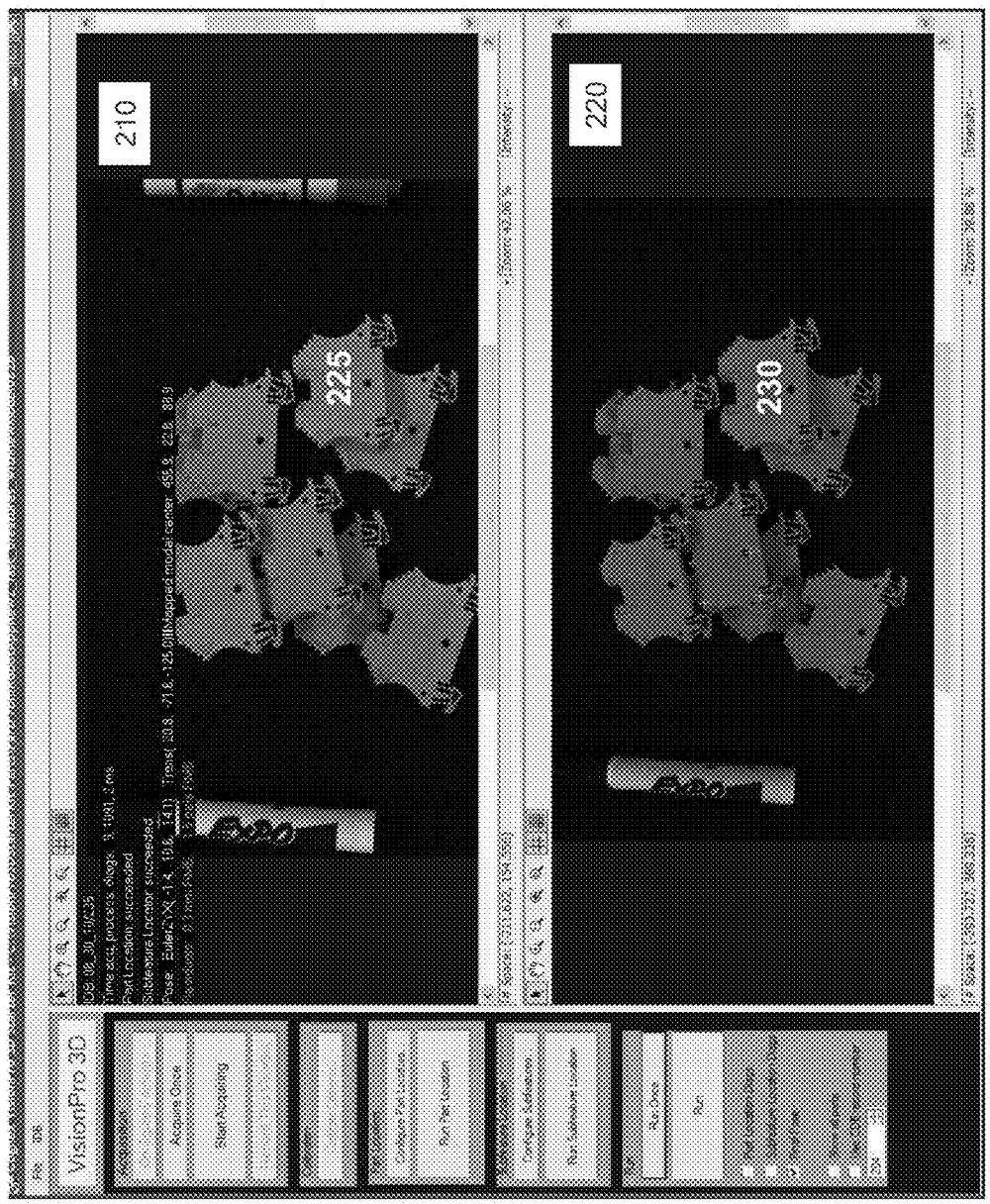
FIG. 2 depicts the fields of view of two image capturing devices.

FIG. 2 depicts the fields of view of two image capturing devices. Field of view 210 is the field of view of a first image capturing device (e.g., image capturing device 105). Field of view 220 is the field of view of a second image capturing device (e.g., image capturing device 110). The field of view 210 and 220 are showing the same group of parts. The technology described herein can be used to facilitate identifying which part instance in one field of view corresponds to a part instance in the other field of view. As used herein, part instance refers to a representation of a physical part within an image.

For example, in FIG. 2, fields of view 210 and 220 both contain several part instances. The computerized systems and computer-implemented methods described herein can aid in matching parts in the field of view 210 to parts in field of view 220 (e.g., determining that part 225 in field of view 210 and part 230 in field of view 220 correspond to the same physical part).

Figure 3:
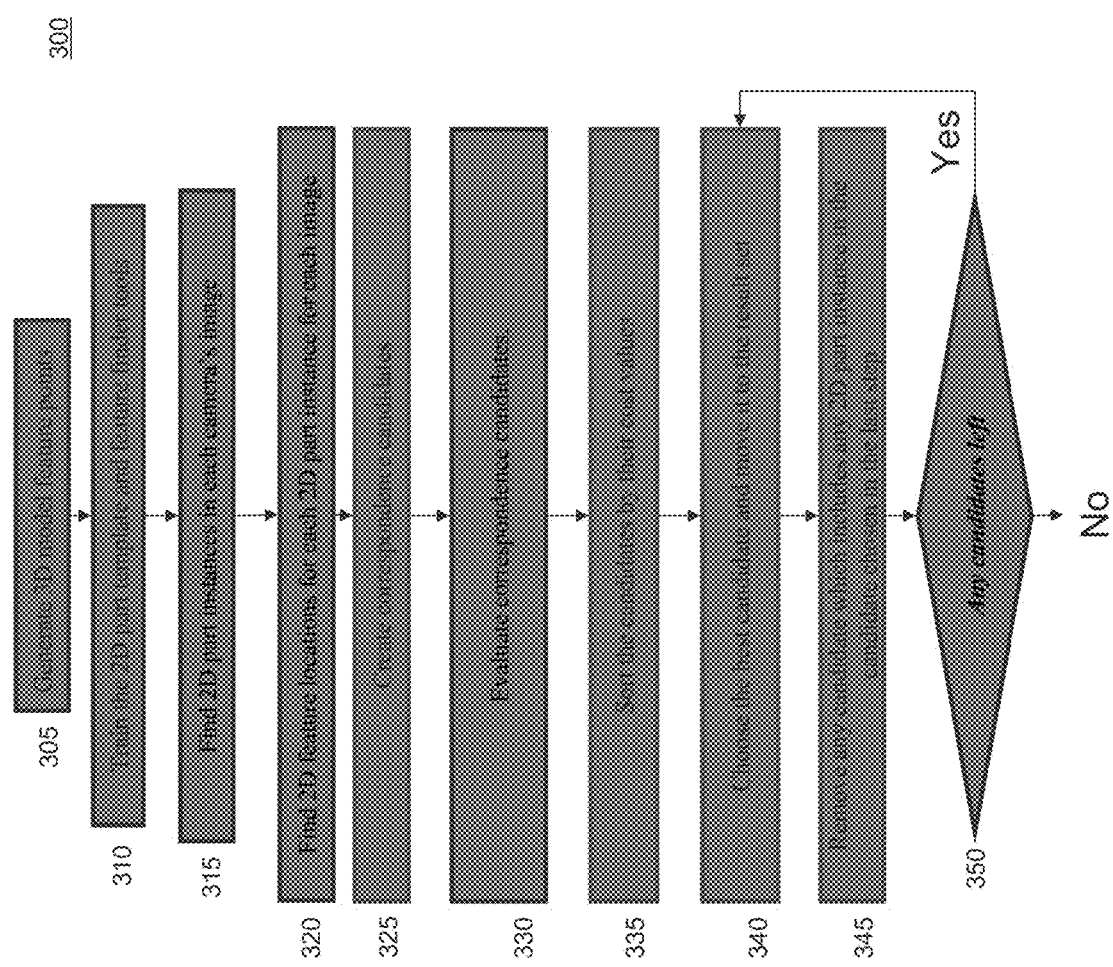
FIG. 3 is a flowchart depicting a method for finding correspondence of one or more parts in the field of view of two or more cameras.

FIG. 3 is a flowchart 300 depicting a method for finding correspondence of one or more parts in the field of view of two or more cameras. At step 305, 3D model features for a part are generated. In some embodiments the 3D model features can be 3D points. In some embodiments the 3D model features can also be at least one of corners, circles, and line segments. A 3D model can be a mathematical description of a physical part. Methods of generating 3D models are well known to those with skill in the art. See, e.g., "Computer Graphics: principles and practice," James D. Foley (1996), the entire contents of which are hereby incorporated by reference. For example, a 3D model can include the dimensions of a part, its vertices, or other attributes specifying the part's physical characteristics. Part features are aspects of the parts that can be selected to aid in identification of parts in an image captured by an image capturing device. For example, part features can be a jagged edge of the part, a hole in the part, or any other physical aspect of the part. Part features can be selected manually or programatically based on the model. A 3D model can be generated using Cognex VisionPro® 3D triangulation functionality offered by Cognex Corporation of Natick, Mass.

At step 310, a part locator tool is trained to locate part instances. A feature finder tool is trained to locate part features. In some embodiments the part locating and the feature finding is performed using the same tool. In some embodiments the part locating and the feature finding is performed using separate tools. In some embodiments features can be located using corner finder, circle finder, or other pattern matching tools. In some embodiments, features can be located directly by applying the 2D pose resulting from the part locator tool (e.g., by using the part location pose to map the features' locations from the training image to the runtime image).

The training step trains the feature finder tool to locate the part described by the 3D model in the 2D image of an image capture device. For example, Cognex PatMax can be trained to find the part features in an image.

Figure 4:
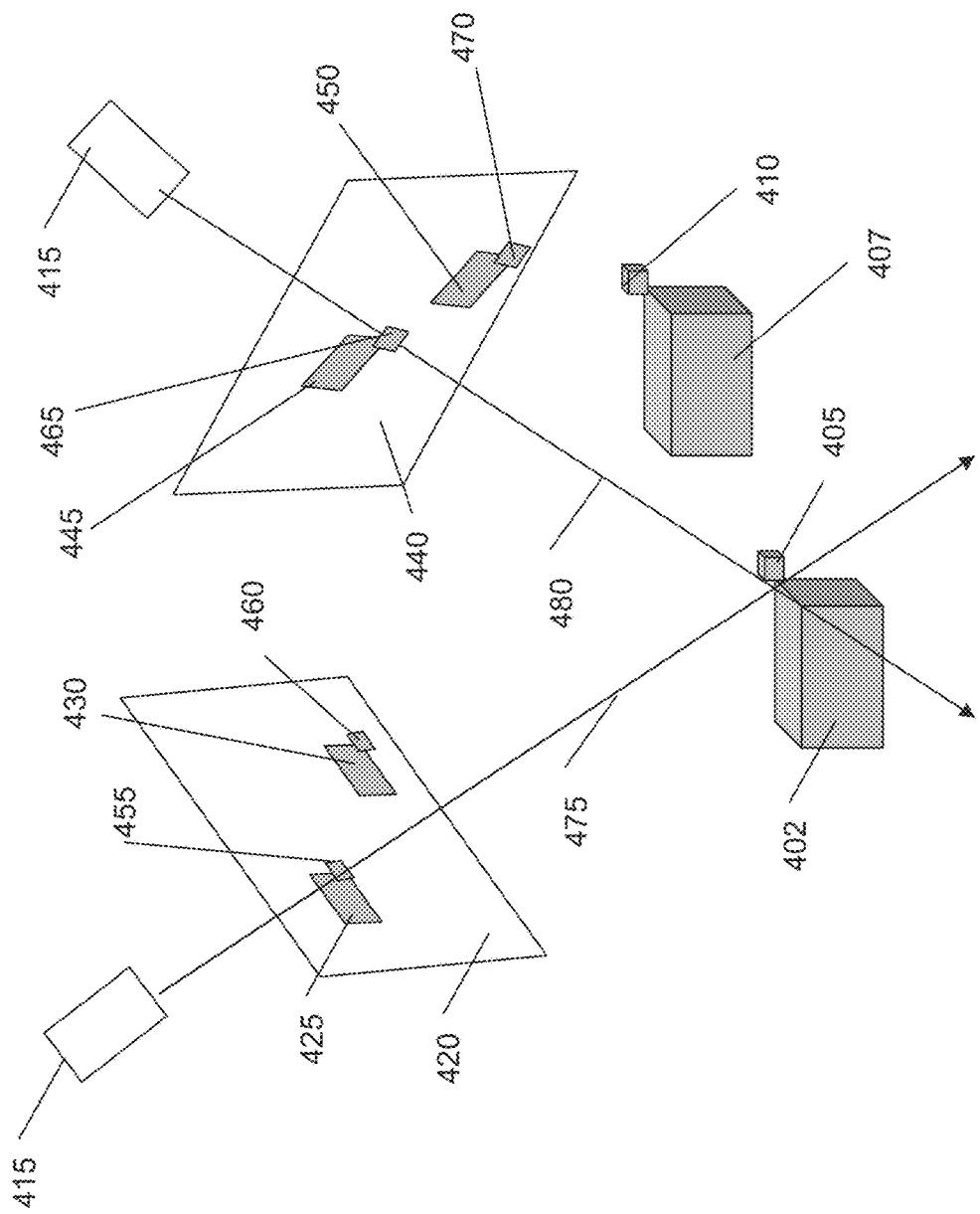
FIG. 4 illustrates parts and images of the parts.

At step 315, 2D part instances are located in each camera's image. FIG. 4 illustrates parts and images of these parts. In FIG. 4, part 402 has feature 405 (e.g., a boxed-corner of part 405) and part 407 has feature 410. Both part 402 and part 407 are modeled by the same model (not shown) and feature 405 and feature 410 are instances of the same feature in the model. Camera 415 can capture an image 420 including 2D projections of part 405 (part instance 425) and part 407 (part instance 430) into the image plane of camera 415. Camera 435 can capture an image 440 including 2D projections of part 405 (part instance 445) and part 407 (part instance 450) into the image plane of camera 435. Part instances can be located in a particular image (e.g., part instances 425 and 430 in image 420 and part instances 445 and 450 in image 440) using, for example, Cognex PatMax. Further description of how Cognex PatMax can find part instances in an image can be found in U.S. Pat. No. 7,016,539, titled "Method for Fast, Robust, Multi-Dimensional Pattern Recognition" and filed Jul. 13, 1998, and in U.S. Pat. No. 7,065,262, titled "Fast high-accuracy multi-dimensional pattern inspection" and filed Nov. 10, 2003, the entire contents of which are hereby incorporated by reference.

At step 320, the feature locations or coordinates for each 2D part instance are found in each camera's image. In the illustrated example of FIG. 4, feature 455 (the 2D projection of feature 405 into image 420), feature 460 (the 2D projection of feature 410 into image 420), feature 465 (the 2D projection of feature 405 into image 440), and feature 470 (the 2D projection of feature 410 into image 440) can be found, for example, using Cognex PatMax. In some embodiments the feature locations can be computed by applying the part location pose to the feature location offset within the part instance. For example, the offset for feature 455 within part instance 425 can be combined with the found pose of part 425 and used as a feature location. A benefit of this approach is that the locations of occluded features can be obtained in this way.

At step 325, a list of correspondence candidates is created. In some embodiments, the correspondence candidate list can be a list of all combinations produced by selecting one part instance from each camera's image. In some embodiments, the correspondence candidate list can be a list including a subset of all combinations produced by selecting one part instance from each camera's image. For example, referring to FIG. 4, the correspondence candidates can be (part instance 425/part instance 445); (part instance 425/part instance 450); (part instance 430/part instance 445); (part instance 430/part instance 450) (e.g., every combination of a part instance from image 420 and a part instance from image 440).

In embodiments using three cameras, the correspondence candidates can include all combinations produced by selecting a part instance from the first camera's image, a part instance from the second camera's image, and a part instance from the third camera's image. As previously noted, the methods described herein can be used with any number of cameras greater than one.

At step 330, correspondence candidates are evaluated. In some embodiments, a correspondence candidate is evaluated based on triangulation using the instances of the same part features in each part instance of the correspondence candidates. Corresponding part features can be compared (e.g., a feature 455 in one part instance 425 is compared to the same feature 465 in another part instance 445). Referring to FIG.

4, for example, correspondence candidate (part instance 425/part instance 445) can be evaluated. Beginning with feature 455, ray 475 (which is a back-projection of the coordinate of feature 455 in image 420 to the 3D physical space) is computed. Ray 480 (which is a back-projection of the coordinate of feature 465 in image 440 to the 3D physical space) is also computed. A ray residual between ray 475 and ray 480 (e.g., the distance between the closest points on rays 475 and 480) is computed. In some embodiments, if the ray residual is greater than a threshold, the correspondence candidate is removed from the correspondence candidate list. A large ray residual can suggest that the part instances being compared correspond to two different physical parts. If the ray residual is less than a threshold, the remaining features are evaluated in a similar manner and the ray residuals are compared to the threshold. If each residual for each of the features is less than the threshold, a correspondence candidate score is computed and the correspondence candidate remains in the correspondence candidate list. In some embodiments, ray residuals are calculated for less than all of the features In some embodiments, the threshold is based on part dimensions. For example, the threshold can be a percentage of a part's dimension along one side.

In some embodiments, the correspondence candidate score can be the average of the residuals. In some embodiments, the correspondence candidate score can be a sum of the residuals.

The ray residual can be calculated in a number of different ways depending on the number of cameras present. For example, in embodiments using three cameras, the ray residual can be calculated as the sum of the distances between three rays (e.g., each ray being a back-projection of a feature coordinate for each camera image to the 3D physical space). In some embodiments, the residual can be calculated as the sum of the distance between the first and second rays and the distance between a point between the first two rays and the third ray. In another embodiment using three or more cameras, the ray residual can be calculated by determining a point between the nearest point of the first and second rays and then projecting the 3D point into the image of the third camera and comparing the distance of the projected point to the location of the feature in the third image.

In some embodiments, the correspondence candidate can be evaluated based on the geometries of the model. For example, a first point between closest points on ray 475 and ray 480 can be calculated. A point between closest points for rays for another feature can be calculated. The computed distance between those two points can be compared to a provided distance between those two features in the part model. For example, a distance residual can be computed that is the difference between the computed distance and the provided distance. In some embodiments, if the distance residual is greater than a threshold, the correspondence candidate is removed from the correspondence candidate list. A large distance residual can indicate that part instances corresponding to two different physical parts are being evaluated. If the distance residual is less than a threshold, the remaining distances between features are evaluated in a similar manner and the distance residuals are compared to the threshold. If each distance residual is less than the threshold, a correspondence candidate score is computed and the correspondence candidate remains on the correspondence candidate list. In some embodiments, the correspondence candidate score can be the average of the distance residuals. In some embodiments, the correspondence candidate score can be a sum of the distance residuals. In some embodiments, the correspondence candidate score can be a weighted average of the distance residuals, where the weighting is based on the model dimension. In some embodiments the correspondence candidate score is based on the ray residuals and the distance residuals.

At step 335 the correspondence candidates in the correspondence candidate list are sorted. In some embodiments, the correspondence candidates are sorted by their respective correspondence candidate scores such that the most likely correspondence candidate is first. The correspondence candidate list can be an array, linked list, or other data structure.

Referring to FIG. 4, for example, the sorted correspondence candidate list can include the following correspondence candidates:
part instance 425/part instance 445 (correspondence candidate score 8);
part instance 430/part instance 450 (correspondence candidate score 9);
part instance 425/part instance 450 (correspondence candidate score 20);
part instance 430/part instance 445 (correspondence candidate score 35).

At step 340, the best correspondence candidate is removed from the correspondence candidate list and added to the result list. In some embodiments the best correspondence candidate must have a score that satisfies a predetermined threshold and is then added to the results list. The results list is a list of part correspondences found.

At step 345, correspondence candidates in the correspondence candidate list that include a part instance in the correspondence candidate removed in step 340 are removed from the correspondence candidate list. For example, referring to the correspondence candidate list above, after correspondence candidate (part instance 425/part instance 445) is removed from the correspondence candidate list as the correspondence candidate with the lowest score, both correspondence candidates (part instance 425/part instance 450) and correspondence candidate (part instance 430/part instance 445) can be removed because each share a part instance with correspondence candidate (part instance 425/part instance 445).

At step 350, it is determined whether there are any candidates left in the correspondence candidate list. If the list is empty, the method can return. The correspondence candidates in the results lists identify the part instance correspondences found.

If there are more correspondence candidates in the correspondence candidates list, the correspondence candidate with the lowest correspondence candidate score is removed from the correspondence candidate list, as described with respect to step 340. The correspondence candidate list is then culled, removing correspondence candidates that share a part instance with correspondence candidate with the lowest correspondence candidate score, as described with reference to step 345.

The above-described techniques can be implemented in digital and/or analog electronic circuitry, or in computer hardware, firmware, software, or in various combinations. The embodiment can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example embodiment, and/or other graphical user interfaces for a transmitting device. The above described techniques can be implemented in a distributed computing system that includes any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Devices of the computing system and/or computing devices can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). A mobile computing device includes, for example, a Blackberry®. IP phones include, for example, a Cisco® Unified IP Phone 7985G available from Cisco System, Inc, and/or a Cisco® Unified Wireless Phone 7920 available from Cisco System, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computer-implemented method utilizing a non-transitory computer readable medium of finding correspondences of one or more parts in a camera image of two or more cameras comprising:
generating 3D model features,
for a first part in a first camera image of a first camera, calculating a first 3D ray that is a first back-projection of a first feature coordinate of the first part in the first camera image to a 3D physical space;
for a second part in a second camera image of a second camera,
calculating a second 3D ray that is a second back-projection of a second feature coordinate of the second part in the second camera image to the 3D physical space,
wherein the first feature coordinate and the second feature coordinate correspond to a first feature as identified in the 3D model features; and
calculating a first distance between the first 3D ray and the second 3D ray.

2. The computer-implemented method of claim 1, further comprising:
for the first part in the first camera image of the first camera,
calculating a third 3D ray that is a third back-projection of a third feature coordinate in the first camera image to the 3D physical space,
for the second part in the second camera image of the second camera,
calculating a fourth 3D ray that is a fourth back-projection of a fourth feature coordinate in the second camera image to the 3D physical space,
wherein the third feature coordinate and the fourth feature coordinate correspond to a second feature as identified in the model; and
calculating a second distance between the third 3D ray and the fourth 3D ray.

3. The computer-implemented method of claim 2, further comprising:
calculating a candidate part correspondence score based on at least one of the first distance and the second distance.

4. The computer-implemented method of claim 3, wherein the candidate part correspondence score is an average of the first distance and the second distance.

5. The computer-implemented method of claim 1, further comprising:
excluding a pairing of the first part in the first camera image of the first camera and the second part in the second camera image of the second camera as a candidate part correspondence if the first distance exceeds a pre-determined threshold.

6. The computer-implemented method of claim 1, further comprising:
for a third part in a third camera image of a third camera,
calculating a third 3D ray that is a third back-projection of a third feature coordinate of the third part in the third camera image to the 3D physical space wherein the first feature coordinate, the second feature coordinate, and the third feature coordinate correspond to the first feature as identified in the model, and
calculating a second distance between the third 3D ray and a first point between closest points on the first and second 3D rays.

7. The computer-implemented method of claim 1, further comprising:
for a third part in a third camera image of a third camera,
calculating a third 3D ray that is a third back-projection of a third feature coordinate of the third part in the third camera image to the 3D physical space wherein the first feature coordinate, the second feature coordinate, and the third feature coordinate correspond to the feature as identified in the model, and calculating a second distance between the first 3D ray and the third 3D ray and calculating a third distance between the second 3D ray and the third 3D ray.

8. A computer-implemented method utilizing a non-transitory computer readable medium of finding correspondence of one or more parts in a camera image of two or more cameras comprising:
generating 3D model features,
for a first part in a first camera image of a first camera,
calculating a first 3D ray that is a back-projection of a first feature coordinate in the first camera image to a 3D physical space,
calculating a second 3D ray that is a second back-projection of a second feature coordinate in the first camera image to the 3D physical space;
for a second part in a second camera image of a second camera,
calculating a third 3D ray that is a third back-projection of a third feature coordinate in the second camera image to the 3D physical space,
calculating a fourth 3D ray that is a fourth back-projection of a fourth feature coordinate in the second camera image to the 3D physical space,
wherein the first feature coordinate and the third feature coordinate correspond to a same first feature as identified in the 3D model features and the second feature coordinate and the fourth feature coordinate correspond to a same second feature as identified in the 3D model features; and
calculating a first point between closest points on the first and third 3D rays and a second point between closest points on the second and fourth 3D rays.

9. The method of claim 8 further comprising calculating a distance between the first point and the second point.

10. The method of claim 9 further comprising comparing the distance with a predetermined value to determine the distance residual.

11. The method of claim 10 wherein the predetermined value is based on the first feature and the second feature as identified in the model.

12. The method of claim 10 wherein the predetermined value is based on an inputted value.

13. The method of claim 10 further comprising calculating a candidate correspondence score based on the distance residual.

14. The method of claim 13 further comprising excluding a pairing of the first part in the first camera image and the second part in the second camera image as a candidate part correspondence if the distance residual exceeds a pre-determined threshold.

15. The method of claim 10 further comprising calculating a first distance between the first 3D ray and the third 3D ray and calculating a second distance between the second 3D ray and the fourth 3D ray; and calculating a candidate part correspondence score based on the distance residual, the first distance and the second distance.

16. A system comprising:
two or more cameras;
a correspondence module configured to:
generate 3D model features,
for a first part in a first camera image of a first camera of the two or more cameras,
calculate a first 3D ray that is a first back-projection of a first feature coordinate of the first part in the first camera image to a 3D physical space;
for a second part in a second camera image of a second camera of the two or more cameras, calculate a second 3D ray that is a second back-projection of a second feature coordinate of the second part in the second camera image to the 3D physical space, wherein the first feature coordinate and the second feature coordinate correspond to a first feature as identified in the 3D model features; and calculate a first distance between the first 3D ray and the second 3D ray.

17. The computer-implemented method of claim 1, wherein the first feature coordinate is computed by applying a part location pose of the first part to a feature location offset associated with the first part feature provided by the 3D model features.

\* \* \* \* \*